(12) United States Patent
Chen (10) Patent No.: US 8,878,506 B2
(45) Date of Patent: Nov. 4, 2014

(54) SWITCHING POWER SUPPLY DEVICE (75) Inventor: Jian Chen, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 13/695,860

(22) PCT Filed: Feb. 20, 2012

(86) PCT No.: PCT/JP2012/053919
§ 371 (c)(1),
(2), (4) Date: Nov. 2, 2012

(87) PCT Pub. No.: WO2012/164981
PCT Pub. Date: Dec. 6, 2012

(65) Prior Publication Data
US 2013/0127432 A1    May 23, 2013

(30) Foreign Application Priority Data

Jun. 2, 2011  (JP) .................................. 2011-124133

(51) Int. Cl.
| | |
|---|---|
| *G06F 1/00* | (2006.01) |
| *G05F 1/10* | (2006.01) |
| *H02M 1/42* | (2007.01) |
| *H02M 1/12* | (2006.01) |

(52) U.S. Cl.
CPC ................ *G05F 1/10* (2013.01); *Y02B 70/126* (2013.01); *H02M 1/4225* (2013.01); *H02M 1/12* (2013.01)
USPC .......................................... 323/283; 323/282

(58) Field of Classification Search
USPC ................................................ 323/282–285
See application file for complete search history.

(56) References Cited

U.S. PATENT DOCUMENTS

| | | | | |
|---|---|---|---|---|
| 5,734,562 | A | * | 3/1998 | Redl ................................ 363/16 |
| 2008/0067993 | A1 | * | 3/2008 | Coleman ........................ 323/282 |
| 2010/0226149 | A1 | | 9/2010 | Masumoto |
| 2010/0246227 | A1 | | 9/2010 | Shimizu |
| 2010/0253305 | A1 | * | 10/2010 | Melanson et al. ............ 323/282 |
| 2011/0261599 | A1 | * | 10/2011 | Duerbaum et al. ............. 363/89 |

FOREIGN PATENT DOCUMENTS

| | | |
|---|---|---|
| JP | 2008-005682 A | 1/2008 |
| JP | 2010-233368 A | 10/2010 |
| JP | 2010-233439 A | 10/2010 |
| JP | 2010-273420 A | 12/2010 |

* cited by examiner

*Primary Examiner* — Adolf Berhane
*Assistant Examiner* — Henry Lee, III
(74) *Attorney, Agent, or Firm* — Rossi, Kimms & McDowell LLP (57) ABSTRACT

An object of the present invention is to achieve the reduction of EMI, the improvement of conversion efficiency, and simplification of the input filter. Provided is a switching power supply device that comprises: a chopper circuit that turns on/off the passage of a current to an inductor by means of a switching element; and a switching control circuit that switches the switching element so that an input voltage and an input current have the same phase and a similar shape. The switching control circuit is configured to switch the switching element at a switching frequency that is proportional to an input voltage dependent term of a formula that expresses a third harmonic component of ripples of the current flowing to the inductor.

3 Claims, 8 Drawing Sheets

SWITCHING POWER SUPPLY DEVICE

This application is a U.S. National Phase Application of PCT International Application PCT/JP2012/053919 filed on Feb. 20, 2012 which is based on and claims priority from JP 2011-124133 filed on Jun. 2, 2011 the contents of which is incorporated in its entirety by reference.

TECHNICAL FIELD

The present invention relates to a switching power supply device that is operated to improve its power factor by making an input voltage waveform and an input current waveform of a chopper circuit have a similar shape and the same phase.

BACKGROUND ART

Patent Documents 1 and 2, for example, propose the switching power supply devices that are designed to improve the power factors thereof by performing the PFC (Power Factor Correction).

In order to reduce switching loss and conduction noise, each of these switching power supply devices according to Patent Documents 1 and 2 lowers the switching frequency around the peaks and bottoms (the peaks, in case of a fully rectified waveform) of an input AC power supply voltage.

In an ordinary switching power supply device, a switching frequency is set within the range of 50 kHz to 70 kHz.

Patent Document 1: Japanese Patent Application Publication No. 2010-233368
Patent Document 2: Japanese Patent Application Publication No. 2010-273420

The control methods described in Patent Documents 1 and 2 cannot achieve both the reduction of EMI (Electro Magnet Interference: electromagnetic noise) and the improvement of the conversion efficiency.

In other words, the bottleneck in reducing EMI is normal noise, a type of conduction noise. Because the standard conduction noise frequency is 150 kHz to 30 MHz, the basic component and second harmonic component thereof is not perfect for a 50 to 70 kHz switching frequency. For this reason, the maximum value of the normal noise is determined based on a third harmonic component of ripples of current flowing to an inductor. Unfortunately, the control methods described in Patent Documents 1 and 2 are not adaptable to third harmonic components and therefore cannot achieve the reduction of EMI and the improvement of conversion efficiency.

DISCLOSURE OF THE INVENTION

The present invention was contrived in view of such circumstances, and an object thereof is to provide a switching power supply device that is capable of achieving both the reduction of EMI and the improvement of conversion efficiency and of simplifying the structure of an input filter provided for the purpose of reducing EMI.

The present invention is a switching power supply device having: a chopper circuit that turns on/off the passage of a current to an inductor by means of a switching element; and a switching control circuit that switches the switching element so that an input voltage waveform and an input current waveform with respect to a phase of an input voltage become substantially similar in shape, wherein the switching control circuit is configured to switch the switching element at a switching frequency that is proportional to an input voltage dependent term of a formula that expresses a third harmonic component of ripples of the current flowing to the inductor.

The switching control circuit can have an oscillator circuit in which an oscillating frequency is controlled by a switching frequency control voltage and the switching frequency of the switching element is defined by the oscillating frequency, and a computing circuit that computes the switching frequency control voltage based on an input voltage of the chopper circuit and an output voltage of the chopper circuit. The switching control circuit can be configured to define a minimum value of the switching frequency.

According to the present invention, the switching frequency is controlled so as to become proportional to an input voltage dependent term of a formula that expresses a third harmonic component of ripples of a current flowing to the inductor. As a result, the third harmonic component can be reduced, and the reduction of EMI and the improvement of conversion efficiency can be achieved. Furthermore, the structure of an input filter can be simplified.

BEST MODE FOR CARRYING OUT THE INVENTION

Figure 1:
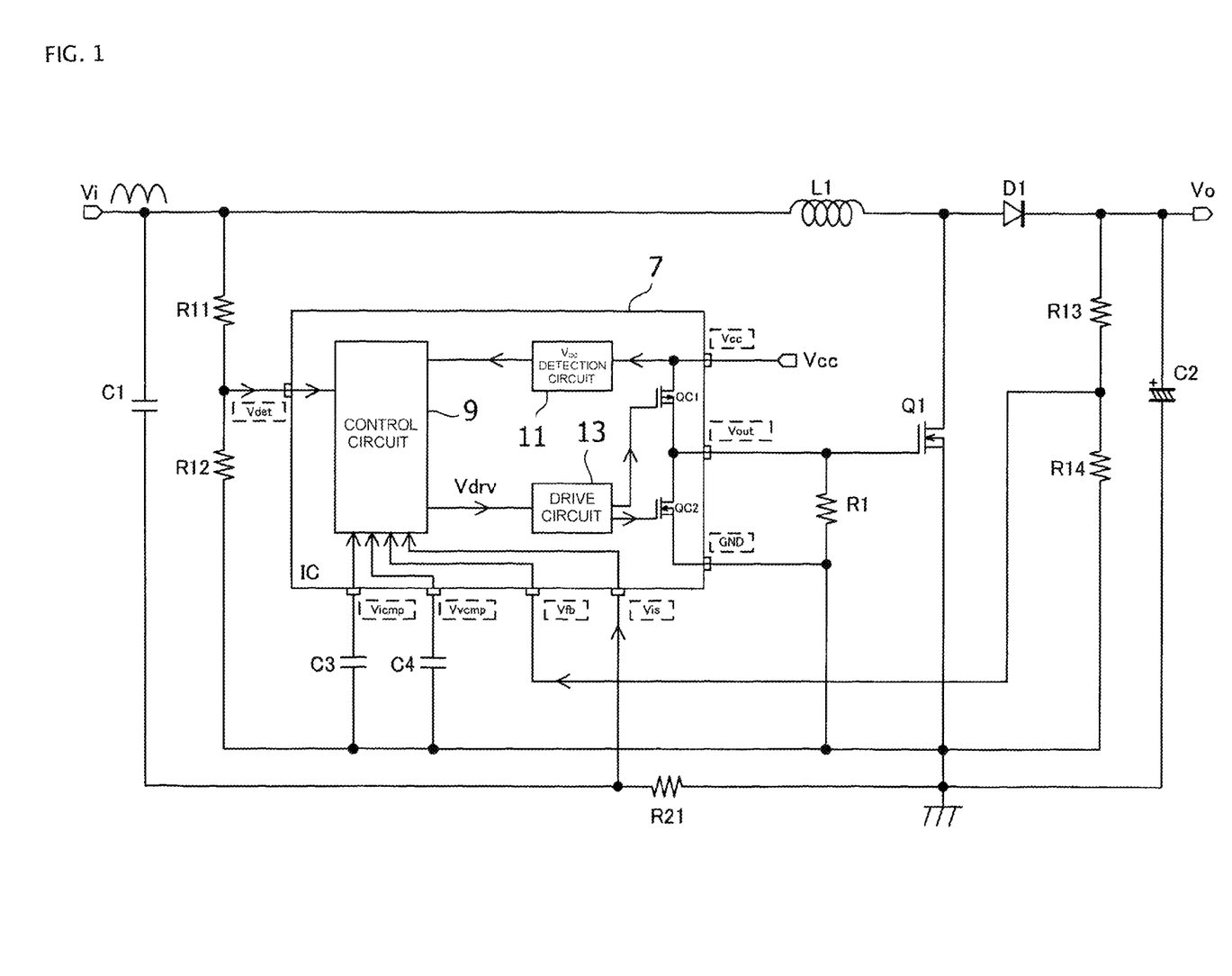
FIG. 1 is a circuit diagram showing the entire configuration of a switching power supply device according to the present invention.

FIG. 1 is a circuit diagram showing the entire configuration of a switching power supply device according to the present invention.

Figure 2:
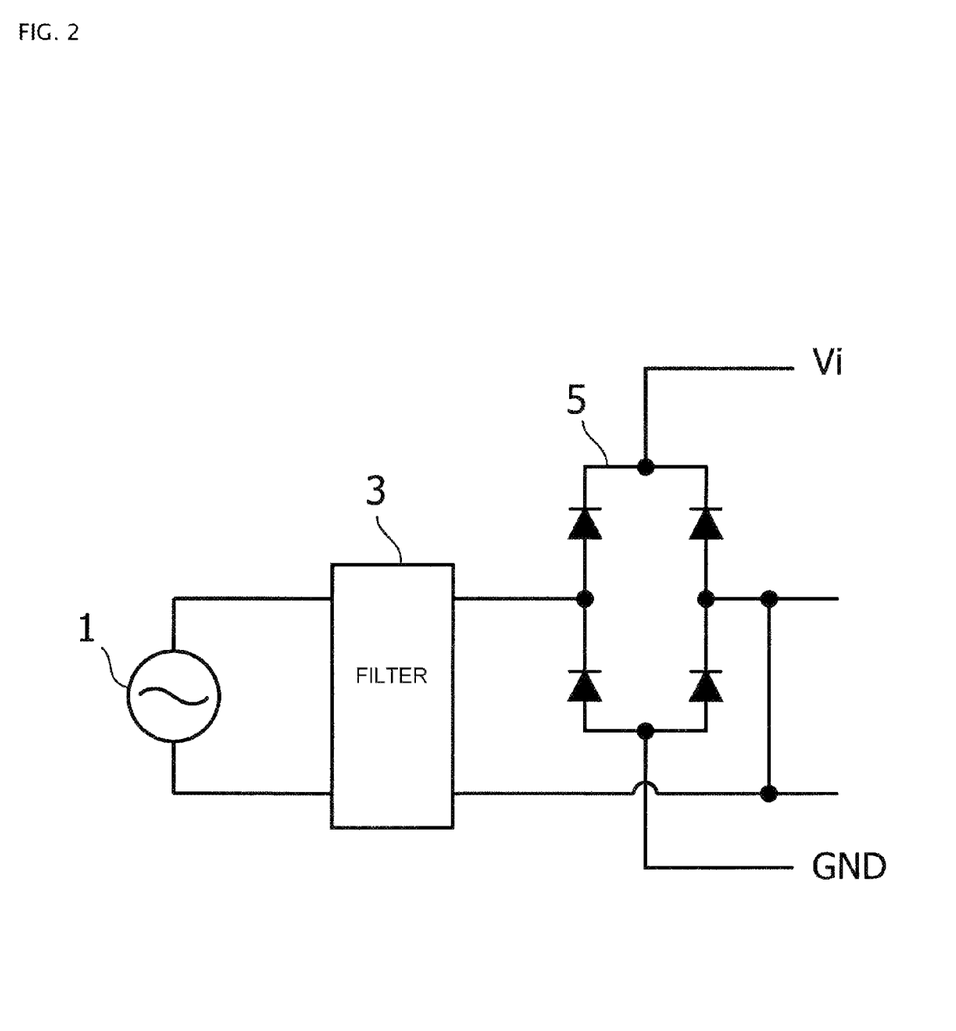
FIG. 2 is a connection diagram showing an AC power supply, an input filter, and a full-wave rectifier circuit.

In this switching power supply device, an input voltage $V_i$ is an output voltage of a full-wave rectifier circuit 5 shown in FIG. 2. After high-frequency noise of the input voltage $V_i$ is removed by a condenser C1, the resultant input voltage $V_i$ is applied to a smoothing condenser C2 through an inductor L1 and diode D1. As a result, a DC voltage $V_o$ smoothed by the smoothing condenser C2 is output from an output terminal of the switching power supply device.

Also, in this switching power supply device, a current that flows from the inductor L1 to the diode D1 is turned on/off by a switching element Q1, such as a MOSFET, that is connected between the inductor L1 and the diode D1 (when the switching element Q1 is turned on, the current flowing to the diode D1 is commutated to the switching element Q1, whereby the current flowing to the diode D1 is turned off).

A controller 7 performs on/off control of the switching element Q1 so that the power factor of the switching power supply device is improved. This controller 7 has a control circuit 9, a $V_{cc}$ detection circuit 11 that detects a voltage $V_{cc}$ and inhibits the operation of the control circuit 9 until the detected voltage $V_{cc}$ exceeds a predetermined value, a drive circuit 13, and complementarily connected switching elements QC1, QC2.

Figure 3:
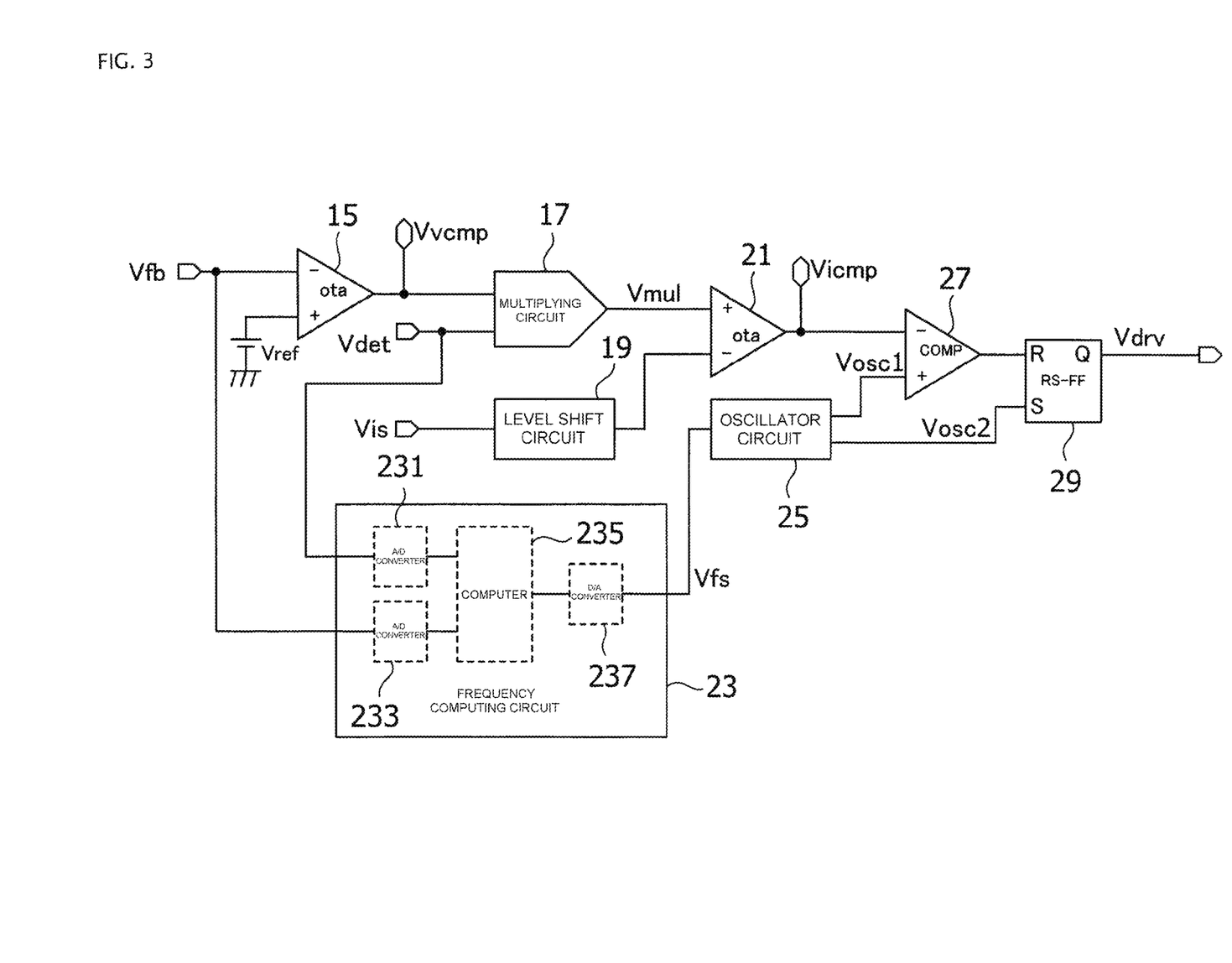
FIG. 3 is a block diagram showing a specific configuration example of a control circuit.

FIG. 3 shows a specific configuration example of the control circuit 9. As shown in FIG. 3, an output voltage error detection circuit 15 configured by an OTA (Operational Transconductance Amplifier) detects an error between a set voltage $V_{ref}$ and a feedback voltage $V_{fb}$, and outputs an output voltage error signal $V_{vcmp}$, which is a signal corresponding to the error. In other words, the output voltage error detection circuit 15 serving as the OTA outputs a current corresponding to a difference between the set voltage $V_{ref}$ and the feedback voltage $V_{fb}$, integrates the current in a condenser C4, and thereby obtains the output voltage error signal $V_{vcmp}$ as a voltage of the condenser C4. The voltage $V_{fb}$ is obtained by dividing the output voltage $V_0$ at partial resistors R13, R14 (see FIG. 1). Therefore, the error signal $V_{vcmp}$ corresponds to an error between the output voltage $V_0$ and a target value.

A multiplying circuit 17 multiplies the output voltage error signal $V_{vcmp}$ by a voltage signal $V_{det}$. The voltage signal $V_{det}$ is obtained by dividing, at partial resistors R11 and R12, the input voltage $V_i$ applied to a chopper circuit configured by the condenser C1, inductor L1, switching element Q1, diode D1, and smoothing condenser C2, as shown in FIG. 1. As described above, the input voltage $V_i$ is an output voltage of the full-wave rectifier circuit 5 shown in FIG. 2. Therefore, the voltage signal $V_{det}$ has a full-wave rectified waveform of an AC voltage that is input from an AC power supply 1 to the full-wave rectifier circuit 5. Thus, the multiplying circuit 17 generates a current control signal $V_{mul}$ that has a similar shape to and the same phase as an absolute value of the input voltage $V_i$ and has an amplitude proportional to the output voltage error signal $V_{vcmp}$.

As shown in FIG. 1, the current flowing through the inductor L1 is converted into a current detection signal $V_{is}$ by a resistor R21. A current error detection circuit 21 configured by an OTA, shown in FIG. 3, detects a difference between the current detection signal $V_{is}$ having its voltage level shifted by a level shift circuit 19 and the current control signal $V_{mul}$, and then outputs signal $V_{icmp}$ expressing the difference. In other words, the current error detection circuit 21 serving as the OTA outputs a current corresponding to a difference between the current detection signal $V_{is}$ having its voltage level shifted and the current control signal $V_{mul}$, integrates the current in a condenser C3, and thereby obtains the signal $V_{icmp}$ as a voltage of the condenser C3.

Because the response of the current detection error detection circuit 21 including the condenser C3 is delayed to some extent, the signal $V_{icmp}$ is a signal obtained by detecting the difference between the current control signal $V_{mul}$ and an average value obtained during a time period corresponding to approximately one switching cycle of the level-shifted current detection signal $V_{is}$.

A comparator circuit 27 compares the signal $V_{icmp}$ with an output signal $V_{osc1}$ (with triangle waves or sawtooth waves) of an oscillator circuit 25 whose oscillating frequency is changed by a frequency control voltage $V_f$ that is output from a frequency computing circuit 23. When the latter value exceeds the former value, the comparator circuit 27 outputs a reset signal to a reset input terminal (R) of a flip-flop 29. On the other hand, an output signal $V_{osc2}$ of the oscillator circuit 25 is a pulse signal that is output when the triangle waves or sawtooth waves of the output signal $V_{osc1}$ start rising. This pulse signal is added to a set input terminal (S) of the flip-flop 29 to set the flip-flop 29 when the output signal $V_{osc1}$ starts rising.

The drive circuit 13 shown in FIG. 1 that is connected to a Q-output terminal of the flip-flop 29 turns on the switching element Q1 by turning the switching elements QC1 and QC2 on and off respectively when an output signal $V_{drv}$ of the flip-flop 29 is at a high level (when setting the flip-flop 29), and turns off the switching element Q1 by turning the switching elements QC1 and QC2 off and on respectively when the output signal $V_{drv}$ is at a low level (when resetting the flip-flop 29).

Once the flip-flop 29 is set by the output signal $V_{osc2}$, the switching element Q1 is turned on. When the value of the output signal $V_{osc1}$ of the oscillator circuit 25 starts increasing as the flip-flop 29 is set and the switching element Q1 is turned on, and the value of the output signal $V_{osc1}$ of the oscillator circuit 25 exceeds the value of the signal $V_{icmp}$ expressing the difference between the value of the current control signal $V_{mul}$ and the average value of the current detection signal $V_{is}$, the high-level signal is input from the comparator circuit 27 to the reset input terminal of the flip-flop 29. As a result, the output signal $V_{drv}$ from the Q-output terminal of the flip-flop 29 becomes at a low level, and the switching element Q1 is turned off through the operations of the drive circuit 13 and the switching elements QC1, QC2. Consequently, the average value, which is obtained during a time period corresponding to approximately one switching cycle of the current flowing to the inductor L1, changes along the waveform of the current control signal $V_{mul}$ that is similar (proportional) to the full-wave rectified waveform of the AC voltage input from the AC power supply 1. Specifically, when the average value of the current detection signal $V_{is}$ is smaller than the value of the control signal $V_{mul}$ the value of the signal $V_{icmp}$ increases, and consequently the ON time of the switching element Q1 is lengthened, increasing the average value of the current flowing to the inductor L1. Furthermore, when the average value of the current detection signal $V_{is}$ is greater than the value of the control signal $V_{mul}$, the value of the signal $V_{icmp}$ drops, and consequently the ON time of the switching element Q1 becomes short, reducing the average value of the current flowing to the inductor L1. In this manner, a current having a similar shape to and the same phase as an input voltage signal V, flows to the inductor L1, improving the power factor of the switching power supply device.

In the switching power supply device, a switching frequency is generally set within the range of 50 kHz to 70 kHz. Because the switching power supply device generates EMI, normally the input filter 3 shown in FIG. 2 is interposed between the AC power supply 1 and the rectifier circuit 5 in order to clear the standard for EMI. The input filter 3 is operated so that the switching noise does not resonate with an external AC line, and is generally characterized in that the higher the noise frequency, the greater the attenuation rate.

The standard of a switching noise frequency is set at 150 kHz or above. Therefore, in a frequency band of approximately 150 kHz to 1 MHZ that is based on a third harmonic, setting the switching frequency at 65 kHz is more advantageous than at 55 kHz in terms of simplifying the structure of the input filter. Raising the switching frequency to approximately 75 kHz causes other problems (degradation of the conversion efficiency due to an increase in switching loss). For this reason, the switching frequency is usually set at approximately 65 kHz.

The bottleneck in reducing EMI is normal noise, a type of conduction noise. Because the standard conduction noise frequency is 150 kHz to 30 MHz, the basic component and second harmonic component thereof is not perfect for a 50 to 70 kHz switching frequency. For this reason, the maximum value of the normal noise is determined based on the third harmonic component of ripples of the current flowing to the inductor L1 shown in FIG. 1. In other words, lowering the third harmonic component of ripples of the current flowing to the inductor L1 can reduce EMI, resulting in the simplification of the structure of the input filter 3 (EMI filter).

Figure 4:
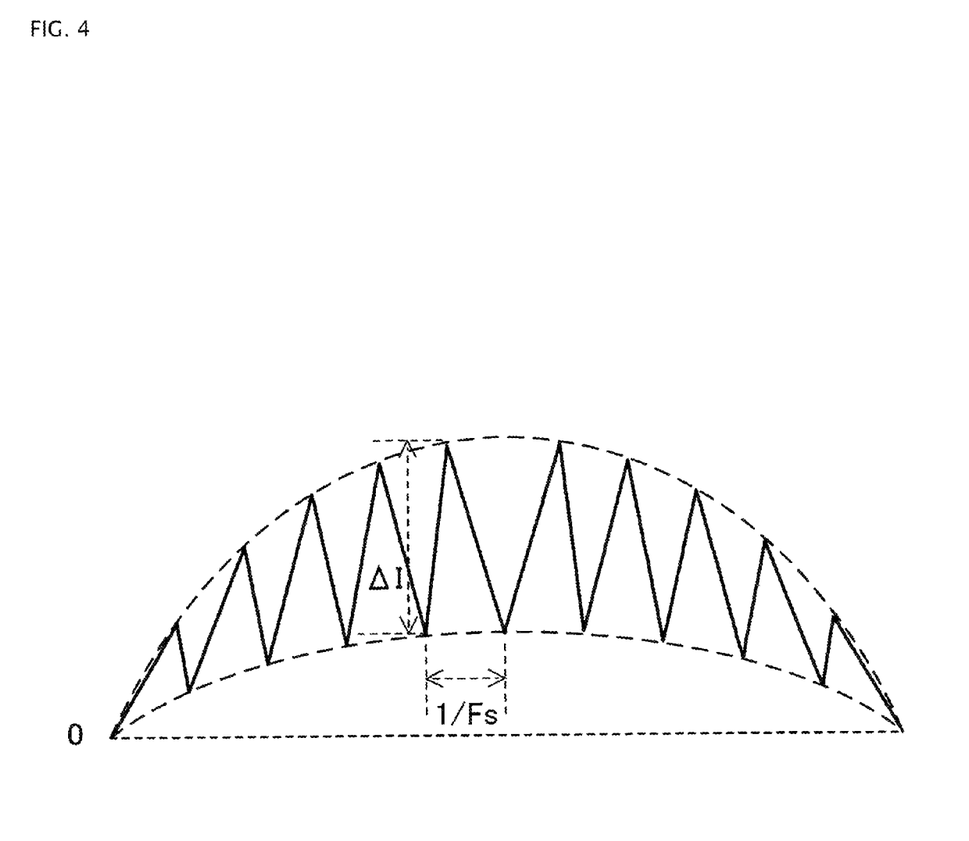
FIG. 4 is a diagram showing an image of a current ripple.

FIG. 4 is a diagram showing an image of a current ripple. The current ripple is given by the following Formula (1).

[Formula 1]

$$\Delta I = \frac{\sqrt{2} * Vac * \sin\theta * D}{L * Fs} \quad (1)$$

In this formula, $V_{ac}$ represents an effective value of an AC input voltage, $\theta$ a phase of the AC input voltage, L an inductance of the inductor L1, $F_s$ a switching frequency, and D the duty of a switching cycle (time ratio or on-time ratio) which is given by the following Formula (2).

[Formula 2]

$$D = 1 - \frac{\sqrt{2} * Vac * \sin\theta}{Vo} \quad (2)$$

In this formula, $V_0$ represents the output voltage.

The third harmonic component expressed by the following Formula (3) is obtained by performing Fourier transform on the abovementioned current ripple $\Delta I$.

[Formula 3]

$$\Delta I^{3rd} = \frac{Vo}{9 * \pi^2 * L * Fs} * \sin\left(3 * \pi * \left(1 - \frac{\sqrt{2} * Vac * \sin\theta}{Vo}\right)\right) \quad (3)$$

In Fourier transform, one of the triangle waves expressed in the solid line in FIG. 4 is extracted and taken as an object to be converted. In so doing, the current ripple $\Delta I$ to be converted is obtained by substituting D of Formula (2) into Formula (1). The position of the peak of the triangle wave is determined by using 1/Fs as a cycle and the duty. The phase $\theta$ is treated as a constant in this Fourier transform and is then used as a parameter in a later analysis.

As is clear from Formula (3), the level of the third harmonic component is inversely proportional to the switching frequency $F_s$ and affected by the effective value $V_{ac}$ and phase $\theta$ of the AC input voltage. Furthermore, Formula (3) shows that the maximum value of the third harmonic component has no connection with the input voltage.

Figure 5:
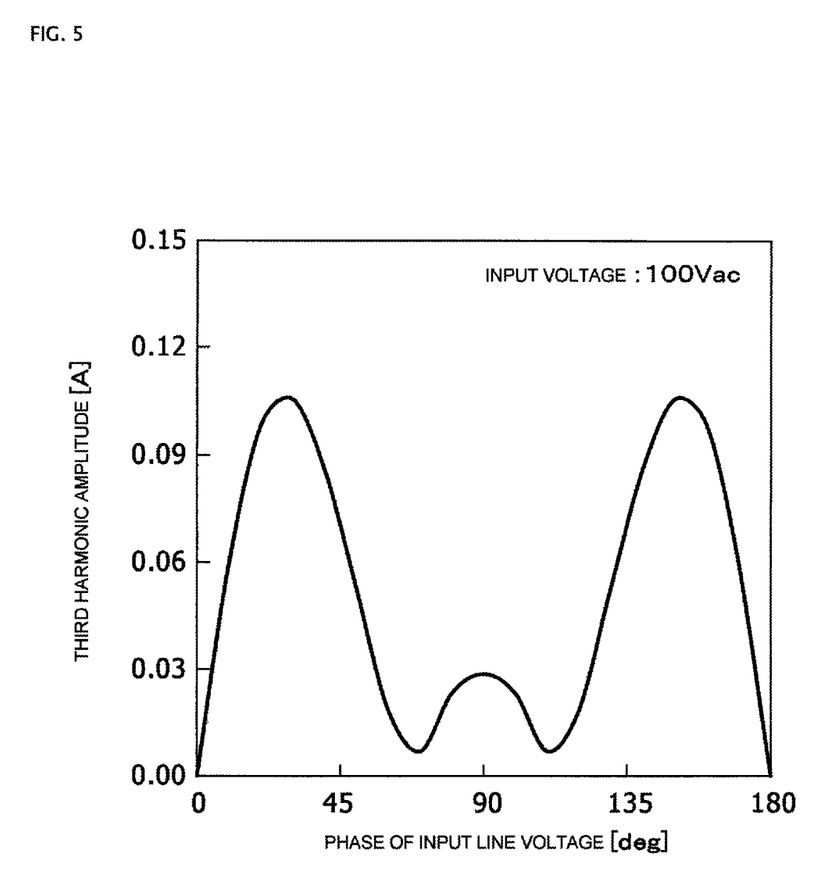
FIG. 5 is a graph showing a relationship between a phase of a 100 $V_{ac}$ input voltage and an amplitude of a third harmonic component of this input voltage.

For instance, the magnitude of the third harmonic component with respect to the phase of each AC input voltage is computed using Formula (3) with $V_0$=390V, L=680 µH, and $F_s$=60 kHz. The computed magnitudes are shown in FIGS. 5, 6, 7 and 8. As shown in FIG. 5, when the input voltage (the actual value of the output voltage of the AC power supply 1 shown in FIG. 2) is 100 $V_{ac}$, the third harmonic component has peak values thereof at phases of approximately 30° and 150° of the input voltage.

Figure 6:
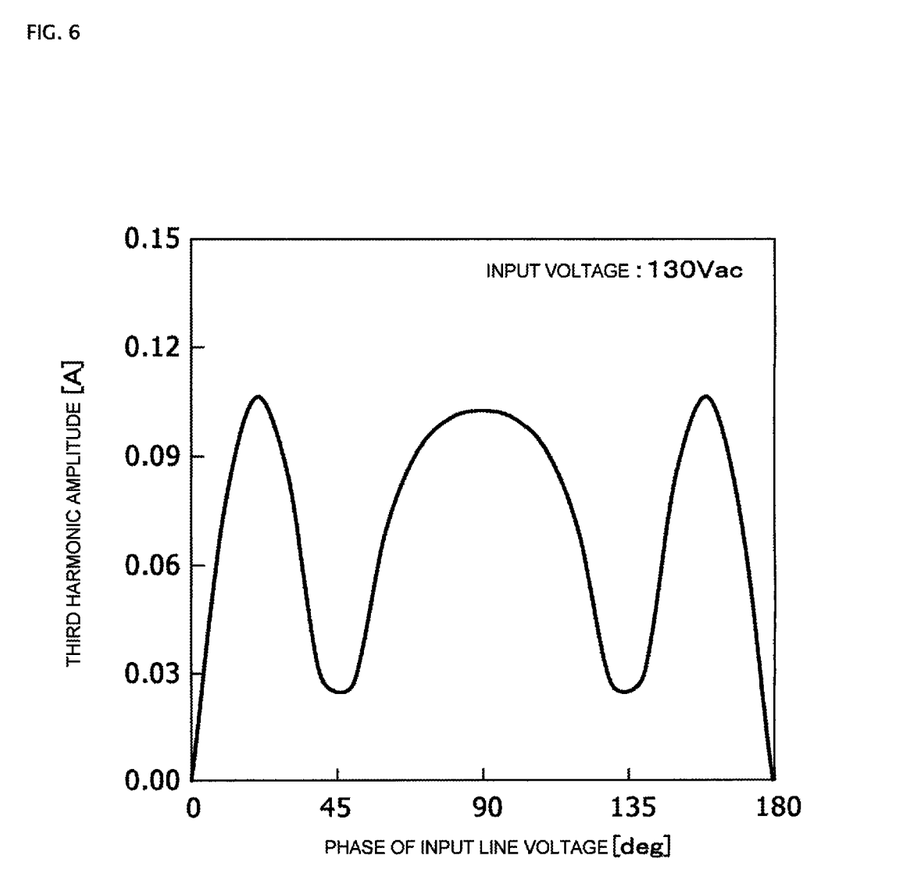
FIG. 6 is a graph showing a relationship between a phase of a 130 $V_{ac}$ input voltage and an amplitude of a third harmonic component of this input voltage.
Figure 7:
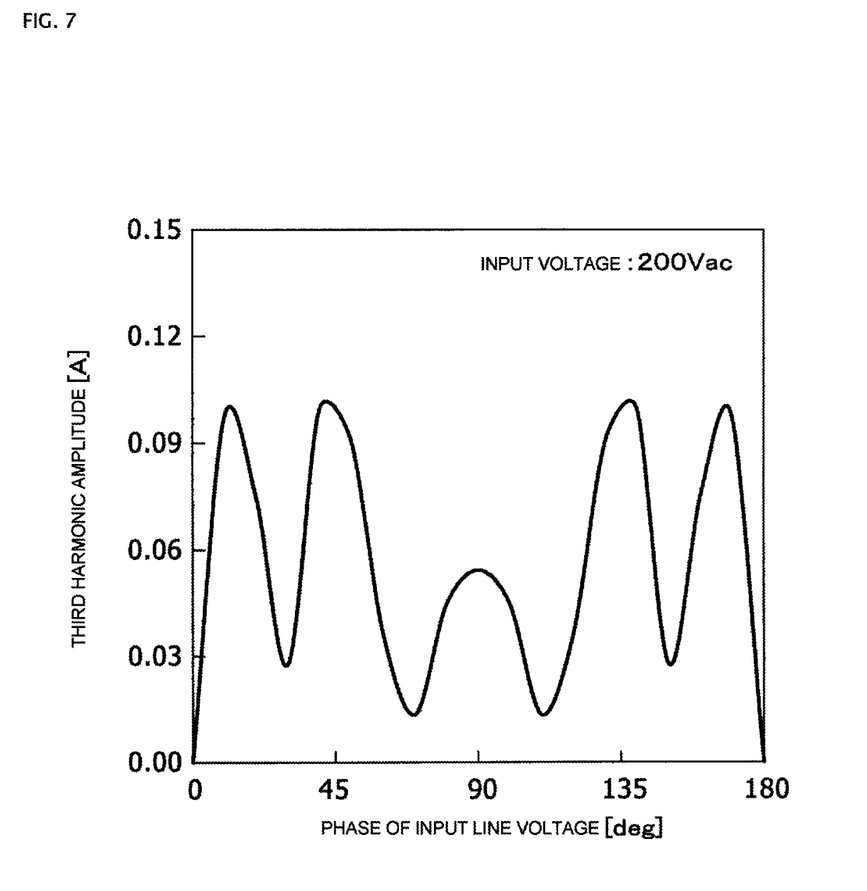
FIG. 7 is a graph showing a relationship between a phase of a 200 $V_{ac}$ input voltage and an amplitude of a third harmonic component of this input voltage.

Moreover, as shown in FIG. 6, when the AC input voltage is 130 $V_{ac}$, the peak values are located at phases of approximately 20°, 90°, and 160° of the input voltage. When the AC input voltage is 200 $V_{ac}$ as shown in FIG. 7, the peak values are located at phases of approximately 15°, 45°, 135°, and 165°.

Figure 8:
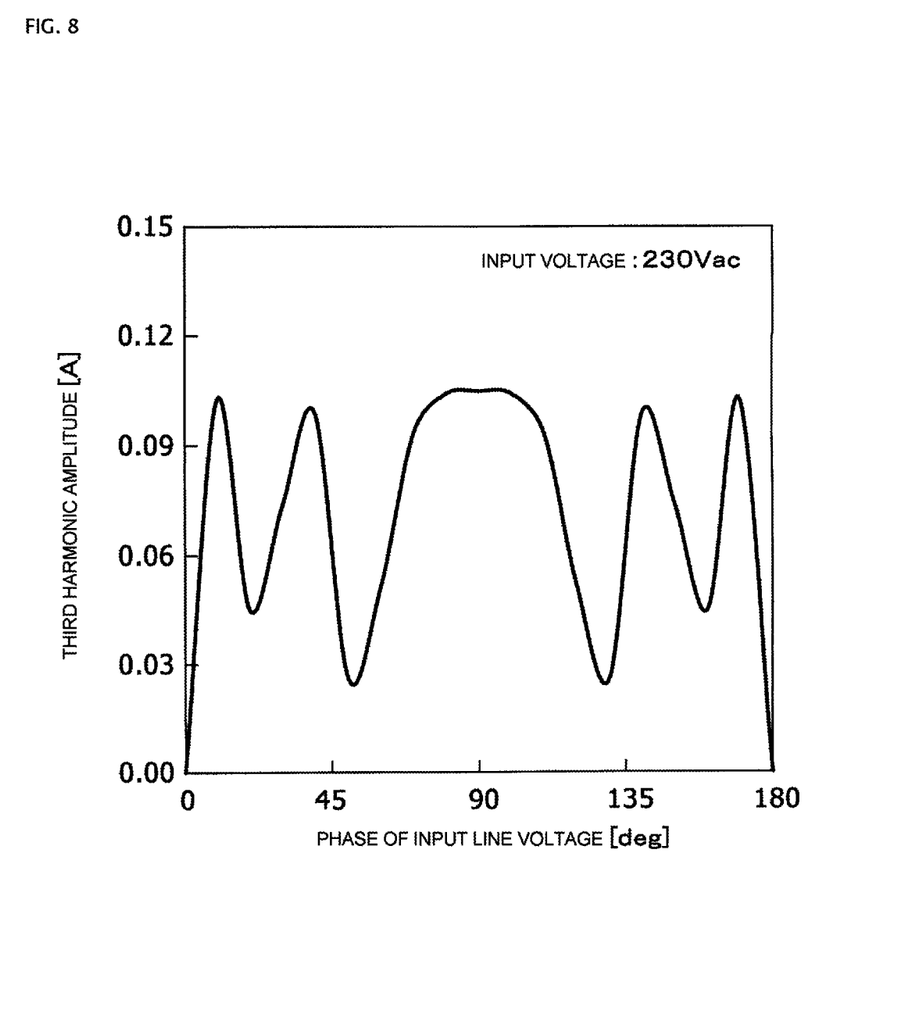
FIG. 8 is a graph showing a relationship between a phase of a 230 $V_{ac}$ input voltage and an amplitude of a third harmonic component of this input voltage.

In addition, when the AC input voltage is 230 $V_{ac}$ as shown in FIG. 8, the peak values are located at phases of approximately 10°, 30°, 90°, 150°, and 170°. In this manner, the phases of the AC input voltage at which the third harmonic component has its peaks change depending on the effective value of the AC input voltage.

As described above, each of the control methods described in Patent Documents 1 and 2 lowers the switching frequency around the peaks and bottoms (the peaks, in case of a fully rectified waveform) of the input AC power supply voltage so as to reduce the switching frequency around the phase 90° when the AC input voltage becomes 100 V and so as to increase the switching frequency around the phases 30° and 150°. In this manner, these control methods improve the conversion efficiencies and prevent the occurrence of EMI.

Therefore, although the reduction of EMI and the improvement of the conversion efficiency can be achieved when the AC input voltage is 100 $V_{ac}$, EMI might not be able to decline significantly, because the third harmonic component is high in spite of the low switching frequency around the phase 90° when the AC input voltage is 130 $V_{ac}$ and 230 $V_{ac}$. The same tendency is observed when the AC input voltage is 200 $V_{ac}$. For this reason, the control methods described in Patent Documents 1 and 2 cannot achieve the reduction of EMI and improvement of the conversion efficiencies, depending on the magnitude of the AC input voltage.

The switching power supply device according to the present embodiment, therefore, controls the switching frequency so as to be able to reduce the third harmonic component regardless of the value of the input voltage.

In order to reduce the third harmonic component regardless of the value of the input voltage, the switching frequency $F_s$ may be controlled so as to become proportional to the input voltage dependent term of Formula (3) that expresses the third harmonic component of the current ripple, so that Formula (3) does not become dependent on the input voltage. At the same time, limitation of a minimum switching frequency is executed.

For example, the minimum switching frequency $F_{smin}$ may be set, and then the switching frequency $F_s$ may be controlled based on the relationship expressed in the following Formula (4).

[Formula 4]

$$Fs = \text{Max}\left(Fs\text{max} * \sin\left(3 * \pi * \left(1 - \frac{\sqrt{2} * Vac * \sin\theta}{Vo}\right)\right), Fs\text{min}\right) \quad (4)$$

In this formula, $F_{smax}$ represents the maximum value of the switching frequency $F_s$. It is clear that the third harmonic component basically is not dependent on the effective value $V_{ac}$ of the AC input voltage and the phase $\theta$ of the AC input voltage, by substituting $F_s$ of Formula (4) into Formula (3).

The frequency control voltage $V_{fs}$ that is output from the frequency computing circuit 23 shown in FIG. 3 and the oscillating frequency $F_s$ of the oscillator circuit 25 are in the following relationship.

[Formula 5]

$$Vfs = Ks * Fs \quad (5)$$

In this formula, $K_s$ represents a constant.

In addition, the input voltage $V_i$ shown in FIG. 1 and the AC input voltage $V_{ac}$ are in the following relationship (technically, $V_i$ represents the absolute value on the right-hand side of Formula (6), and the following argument is established similarly).

[Formula 6]

$$Vi = \sqrt{2} * Vac * \sin\theta \tag{6}$$

In this formula, when the frequency control voltage $V_{fs}$ is set at $V_{fsmax}$ and $V_{fsmin}$ to obtain the maximum frequency and the minimum frequency of the oscillating frequency $F_s$ of the oscillator circuit 25, the frequency control voltage $V_{fs}$ is expressed in the following Formula (7) using Formulae (4) to (6).

[Formula 7]

$$Vfs = Vfsmax * \sin\left(3*\pi*\left(1 - \frac{Vi}{Vo}\right)\right), Vfsmin \tag{7}$$

The input voltage $V_i$ and a monitor voltage $V_{det}$ related to the voltage $V_i$ are in the following relationship.

[Formula 8]

$$Vi = Mi * V*det \tag{8}$$

Further, the relationship between the output voltage $V_O$ and a feedback voltage $V_{fb}$ related to the voltage $V_O$ is expressed as follows.

[Formula 9]

$$Vo = Mo * Vfb \tag{9}$$

In this formula, constants $M_i$ and $M_o$ are determined by a resistance division ratio.

Formula (7) described above is expressed as follows by using the relationship between Formulae (8) and (9).

[Formula 10]

$$Vfs = \text{Max}\left(Vfsmax * \sin\left(3*\pi*\left(1 - \frac{Mi}{Mo}*\frac{Vdet}{Vfb}\right)\right), Vfsmin\right) \tag{10}$$

A computer 235 of the frequency computing circuit 23 shown in FIG. 3 takes in the monitor voltage $V_{det}$ related to the input voltage $V_i$ via an A/D converter 231 and takes in the feedback voltage $V_{fb}$ related to the output voltage $V_O$ via an A/D converter 233, to execute the computation of Formula (10). The frequency control voltage $V_{fs}$ obtained in this computation is output to the oscillator circuit 25 via a D/A converter 237.

According to the switching power supply device of the present embodiment that controls the oscillating frequency of the oscillator circuit 25 by using the frequency control voltage $V_{fs}$ determined in Formula (10), the switching frequency is controlled so as to become proportional to the input voltage dependent term of the formula that expresses the third harmonic component of the ripples of the current flowing through the inductor L1. Therefore, the reduction of EMI and the improvement of the conversion efficiency can be achieved by reducing the third harmonic component, and the structure of the filter 3 can be simplified. The minimum switching frequency $F_{smin}$ is provided, because the switching frequency might drop to zero if the minimum switching frequency is not set. When the switching frequency decreases, the size of a necessary inductor or smoothing condenser increases, resulting in an increase of an output ripple. For this reason, it is important to provide a lower limit of the switching frequency.

EXPLANATION OF REFERENCE NUMERALS

1 AC power supply
3 Input filter
5 Full-wave rectifier circuit
7 Controller
9 Control circuit
11 $V_{cc}$ detection circuit
13 Drive circuit
15 Output voltage error detection circuit
17 Multiplying circuit
19 Level shift circuit
21 Current error detection circuit
23 Frequency computing circuit
231, 233 A/D converter
235 Computer
237 D/A converter
25 Oscillator circuit
27 Comparator circuit
29 Flip-flop
L1 Inductor
D1 Diode
Q1 Switching element
C1, C2, C3, C4 Condenser
R11 to R13 Partial resistor
R21 Detecting resistor

The invention claimed is:

1. A switching power supply device, comprising:
a chopper circuit that turns on/off the passage of a current to an inductor by means of a switching element; and
a switching control circuit that switches the switching element so that an input voltage waveform and an input current waveform with respect to a phase of an input voltage become substantially similar in shape,
wherein the switching control circuit is configured to switch the switching element at a switching frequency that is proportional to an input voltage dependent term of a formula that expresses a third harmonic component of ripples of the current flowing to the inductor, and
wherein the formula is stated as $$V_{fs} = V_{fs\,max} * \sin(3*\pi*(1 - V_i/V_o)), V_{fs\,min}$$

where $V_{fs}$ is a switching frequency control voltage, $V_{fs\,max}$ is a voltage at a maximum oscillation frequency, $V_{fs\,min}$ is a voltage at a minimum oscillation frequency, $V_i$ is the input voltage, and $V_o$ is an output voltage of the control circuit.

2. The switching power supply device according to claim 1, wherein the switching control circuit has:
an oscillator circuit in which an oscillating frequency is controlled by the switching frequency control voltage and the switching frequency of the switching element is defined by the oscillating frequency; and
a computing circuit that computes the switching frequency control voltage based on the input voltage of the chopper circuit and the output voltage of the chopper circuit.

3. The switching power supply device according to claim 1, wherein the switching control circuit is configured to define a minimum value of the switching frequency.

* * * * *